(12) United States Patent
Rhoads et al.

(10) Patent No.: US 8,656,641 B2
(45) Date of Patent: Feb. 25, 2014

(54) SELF-WATERING FRUIT TREE CONTAINER WITH ROOT PRUNING AERATIONS APERTURES AND EXTERIOR WATER LEVEL INDICATOR

(76) Inventors: Ralph Rhoads, Bellingham, WA (US); George Charles Anderson, Portland, OR (US)

( * ) Notice: Subject to any disclaimer, the term of this patent is extended or adjusted under 35 U.S.C. 154(b) by 0 days.

(21) Appl. No.: 13/551,182

(22) Filed: Jul. 17, 2012

(65) Prior Publication Data

US 2013/0174484 A1 Jul. 11, 2013

Related U.S. Application Data

(63) Continuation-in-part of application No. 13/071,976, filed on Mar. 25, 2011, now Pat. No. 8,510,988.

(51) Int. Cl.
*A01G 27/02* (2006.01)
*A01G 27/06* (2006.01)

(52) U.S. Cl.
USPC .................................................. 47/80; 47/81

(58) Field of Classification Search
USPC ....................................................... 47/80–81
See application file for complete search history.

(56) References Cited

U.S. PATENT DOCUMENTS

| 2,189,982 | A | * | 2/1940 | Haglund | 47/80 |
| 4,434,576 | A | * | 3/1984 | Sowerwine | 47/39 |
| 4,739,581 | A | * | 4/1988 | Jarvis | 47/71 |
| 4,916,857 | A | * | 4/1990 | Kinghorn | 47/66.5 |
| 2005/0223639 | A1 | * | 10/2005 | Whitcomb | 47/65.6 |
| 2008/0072493 | A1 | * | 3/2008 | Pfister | 47/80 |
| 2010/0287833 | A1 | * | 11/2010 | Keats | 47/81 |

FOREIGN PATENT DOCUMENTS

EP 1175825 A2 * 1/2002 ............ A01G 27/06

* cited by examiner

*Primary Examiner* — Son T Nguyen
*Assistant Examiner* — Kathleen Alker
(74) *Attorney, Agent, or Firm* — Craig A. Simmermon

(57) ABSTRACT

Self-watering fruit tree container comprises a container holding a living plant that is positioned above a container holding a pool of water or nutrient solution where the water may be absorbed by the living plant through a permeable bottom and/or side of the plant container. Self-watering fruit tree container allows for an airspace layer between the plant container and the water container which prevents excessive absorption of water into the plant container, thereby preventing root rot. Self-watering fruit tree container achieves this partially by special funnel shaped root-pruning aeration apertures in the bottom of the plant container that allow very small roots and root hairs to pass and grow through the bottom of the plant container and into the water reservoir below, while pruning and stopping larger roots, and also allowing for aeration of soil in the plant container.

1 Claim, 6 Drawing Sheets

FIG. 4
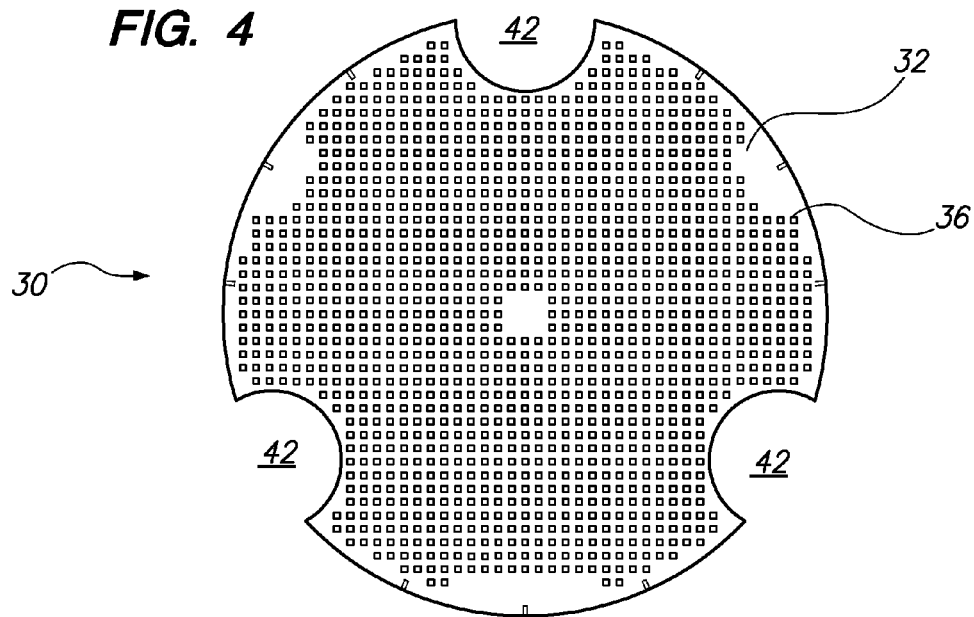
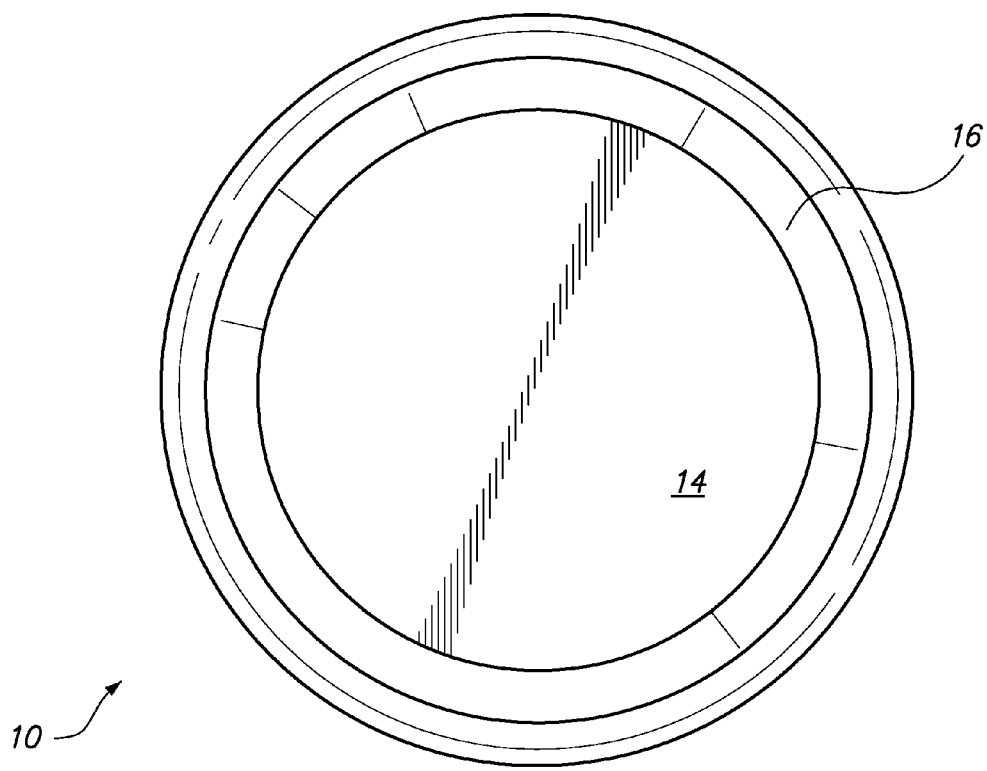

SELF-WATERING FRUIT TREE CONTAINER WITH ROOT PRUNING AERATIONS APERTURES AND EXTERIOR WATER LEVEL INDICATOR

CROSS-REFERENCE TO RELATED APPLICATIONS

The instant application is a continuation-in-part of U.S. application Ser. No. 13/071,976 entitled "Self-Watering Plant Container with Root Pruning Aeration Apertures and Exterior Water Level Indicator" filed on Mar. 25, 2011 now U.S. Pat. No. 8,510,988, which is hereby incorporated by reference herein.

BACKGROUND OF THE INVENTION

1. Field of the Invention

Many times there is a need to grow fruits, vegetables, or flowers in pots or containers as opposed to growing them in the ground. This need may arise from a lack of ground space available to the plant grower in which to grow plants. Lack of ground space may be an issue for those people who live in apartments, condominiums, townhouses, urban areas, row houses, high-density housing areas, or other dwellings that do not have yards or ground space included with the property.

Typically, the fruits, vegetables, and flowers harvested from plants grown in containers are smaller and/or of lesser quality or taste than those produced from plants grown in the ground. This is primarily due to the availability of more water and nutrients in the ground as opposed to those available to plants growing in plant containers. The ground tends to be naturally wet or moist from rain, water table, or other natural source, with plenty of nutrients, at least much more so than a typical plant growing in a typical plant container. Plant containers are not in contact with the ground to receive benefit from the water and nutrients there. Plant containers essentially must receive water and nutrients from the plant grower, who typically cannot deliver such in the optimum quantities and methods as nature does. Even when a plant container is exposed to rainwater, the rainwater tends to wash nutrients out of the soil, as the rainwater flushes in through the top of the container and out through the bottom, thereby depleting the soil in the container of nutrients. Thus, typically, conditions are better for a plant in the ground rather than in a plant container, thereby leading to better harvests from plants growing in the ground.

One particular concern regarding growing plants in containers is the plant disease commonly called "root rot". This disease arises from too much moisture in the root system of a plant. What typically occurs is the plant grower over-waters the plant, unknowingly, thinking that he is helping increase the harvest. However, in actuality, the excess water typically cultures molds in the root system, where the molds feed on the root system or otherwise kill the root system thereby killing the plant. This excess moisture condition typically does not occur in the ground because excess water or moisture in a plant's root system typically drains by percolating down into the soil layers in the ground below the plant roots. On the other hand, with a plant container, there is nowhere for the excess moisture to drain because a plant container's bottom is typically a water barrier. There may be drainage holes in the bottom of the plant container, however, the plant grower typically places the plant container in a saucer. Typically, drainage water fills up the saucer to be reabsorbed back into the plant container later, thereby preventing any real drainage of excess water or moisture. Even when there is actual drainage, water drains by flowing over the saucer brim, so the soil remains wet as long as the saucer remains full of water. The plant grower typically keeps the saucer full of water in order to prevent the plant from drying out, however, in actuality it frequently harms the plant by causing root rot.

On the other hand, root rot may be prevented by allowing the saucer and soil to dry out for a few hours or more at the end of each watering cycle, by not refilling the saucer until after the soil has dried out for a while. This allows the root system of the plant to dry out for a time period, which kills the mold. The killing of the mold prevents the root rot. A dry cycle, so to speak, in the watering cycle of the plant, will prevent root rot.

However, when the dry cycle occurs, the plant is losing valuable water and nutrient absorption time because the root system is allowed to dry out. In effect, every second of dry-out time required to prevent root rot detracts from the quality and quantity of the harvest. This is because plants use water in photosynthesis. Photosynthesis is the process used by plants to grow, i.e. to increase mass and form new roots, trunks, branches, stems, leaves, fruits, vegetables, flowers, etc. In the photosynthesis process, photons from a light source shining on a plant leaf break apart water molecules absorbed by the plant through the roots, thereby freeing hydrogen atoms from the water. The hydrogen atoms then combine with carbon from carbon dioxide absorbed by the plant from the air to form carbohydrate molecules or glucose. Glucose is then moved to different areas of the plant and used by the plant to form new plant tissue, including fruits, vegetables, and flowers. Thus, in short, plants combine light, water, and air to produce the fruits, vegetables, and flowers. Further, in order for a root to stay alive and to absorb water and nutrients efficiently into the plant's system, the root must be kept moist. However, when the root system is allowed to dry out, for instance, in order to prevent root-rot, the roots cannot absorb water and nutrients at all and moreover the root system faces a threat of dying if left to dry out for too long. When a plant root is dry, it is not absorbing water and nutrients during that time and additionally after the root becomes wet or moist again more time is required for the root to be capable of absorption again. Therefore, the dry time to prevent root rot wastes valuable photosynthesis time, which naturally detracts from the harvest of the plant.

2. Description of Related Art

To prevent excess moisture causing root rot in plant containers, some containers are constructed to provide an air layer or air space between the water level in the saucer or water pan and the bottom of the soil or growing medium with root system, thereby suspending the root system above the water level, keeping the root system more dry, and preventing it from contracting root rot. By the same token, however, the root system should not be kept too dry because this detracts from optimum water and nutrient absorption of the plant, thereby detracting from the optimum harvest from the plant. To combat this, while still preventing root rot, some containers are designed with wicking chambers. Wicking chambers are smaller areas of the soil medium that actually do extend down below the water level in the saucer so that soil in the wicking chamber may absorb or wick water up and carry it into the main soil medium chamber, which is located above the airspace and above the water level in the saucer. The wicking chamber must be designed in such a way so as to absorb or wick enough water and nutrients into the main soil chamber to render rapid growth of the plant along with rapid growth of its fruits, vegetables, or flowers, but not too much as to cause root rot which typically leads to total failure of the plant. There are several devices in the prior art that have this air layer along with wicking chambers to function in such a way.

However, nothing in the prior art includes a separate insert member that supports the soil or growing medium above a water reservoir where the insert member has specially shaped root-pruning aeration apertures that allow the plant's root system to stay moist so that the roots may continuously absorb water and nutrients throughout the day while also preventing the root system from becoming too wet to allow root rot to develop. Root-pruning aeration apertures accomplish this in part by forcing large roots back into the soil chamber and not allowing them to pass through the insert and into the water reservoir, while also allowing only tiny roots or root hairs to pass through the insert and into the water reservoir. This division is key to preventing the over-wetting of the soil. Root-pruning aeration apertures also allow air to permeate through them thereby aerating the root system, but not allowing too much air to permeate so as to cause the roots to dry out, thereby slowing or stopping the absorption of water and nutrients by the roots of the plant. There are other special aspects of the insert member that are patentable.

BRIEF SUMMARY OF THE INVENTION

Self-watering fruit tree container includes a container used to hold a living plant and soil or growing medium in which to grow the plant. Self-watering fruit tree container also includes a container to hold a pool of water or nutrient solution underneath the plant/soil container where the water may be absorbed by the living plant through a permeable bottom in the plant/soil container. Self-watering fruit tree container also includes an airspace layer located between the bottom of the plant/soil container and the top of the water or nutrient solution pool in order to prevent excessive moisture or water from being absorbed into the plant's soil.

Self-watering fruit tree container achieves this partly by specially shaped root-pruning aeration apertures in the bottom of its plant/soil container that allow very small roots and root hairs to grow through the bottom of plant/soil container and into the water reservoir below, while preventing other roots from doing this, while also allowing for aeration of the plant/soil container. Self-watering fruit tree container uses these very small roots and root hairs in order to absorb water from the reservoir.

Self-watering fruit tree container also includes a wicking chamber that is a smaller chamber of soil or growing medium that extends down below the bottom of plant/soil container and into the water reservoir. The wicking chamber functions to absorb water or nutrients from the reservoir and to carry the water/nutrients upwards into the main soil chamber.

It is an aspect of self-watering fruit tree container to hold one or more living plants along with at least one hundred pounds of soil or growing medium. It is an aspect self-watering fruit tree container that, no matter how often the container is watered by the plant grower, it will not develop root rot as a result. It is an aspect self-watering fruit tree container that the water level of its reservoir may be inspected from a distance or by walking by it. It is an aspect self-watering fruit tree container to have an exposed water reservoir so that the water reservoir may be refilled from the exterior by pouring water into the exposed reservoir. It is an aspect self-watering fruit tree container to hold up to the elements and to not deteriorate and remain functioning and sturdy after many years of exposure to outside weather.

BRIEF DESCRIPTION OF THE DRAWINGS

FIG. 4 is a top plan view of best mode Insert Member best mode Saucer Member.

Figure 1:
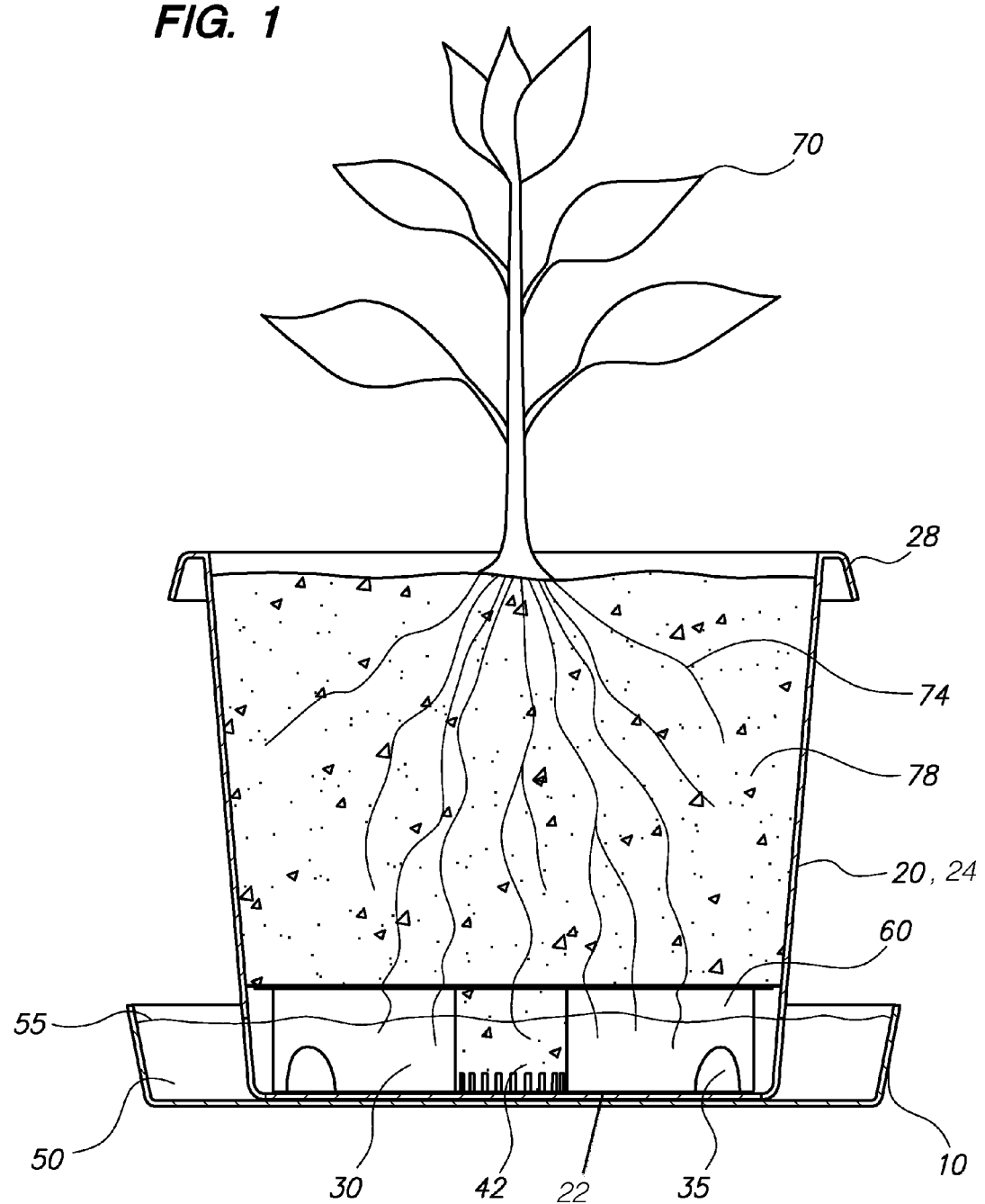
FIG. 1 is a cross-sectional view of self-watering fruit tree container.
Figure 2:
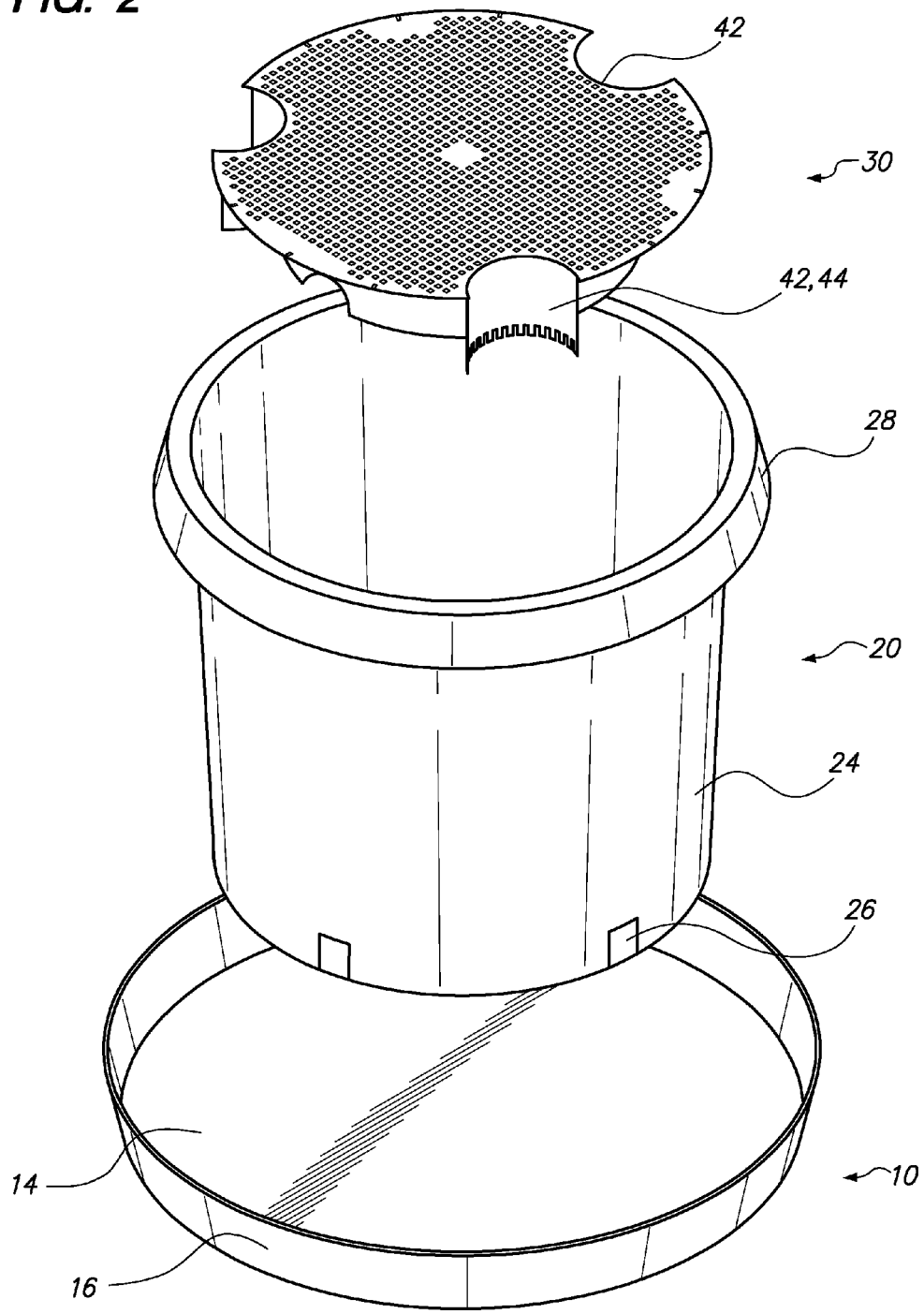
FIG. 2 is an exploded view of best mode of self-watering fruit tree container.
Figure 3:
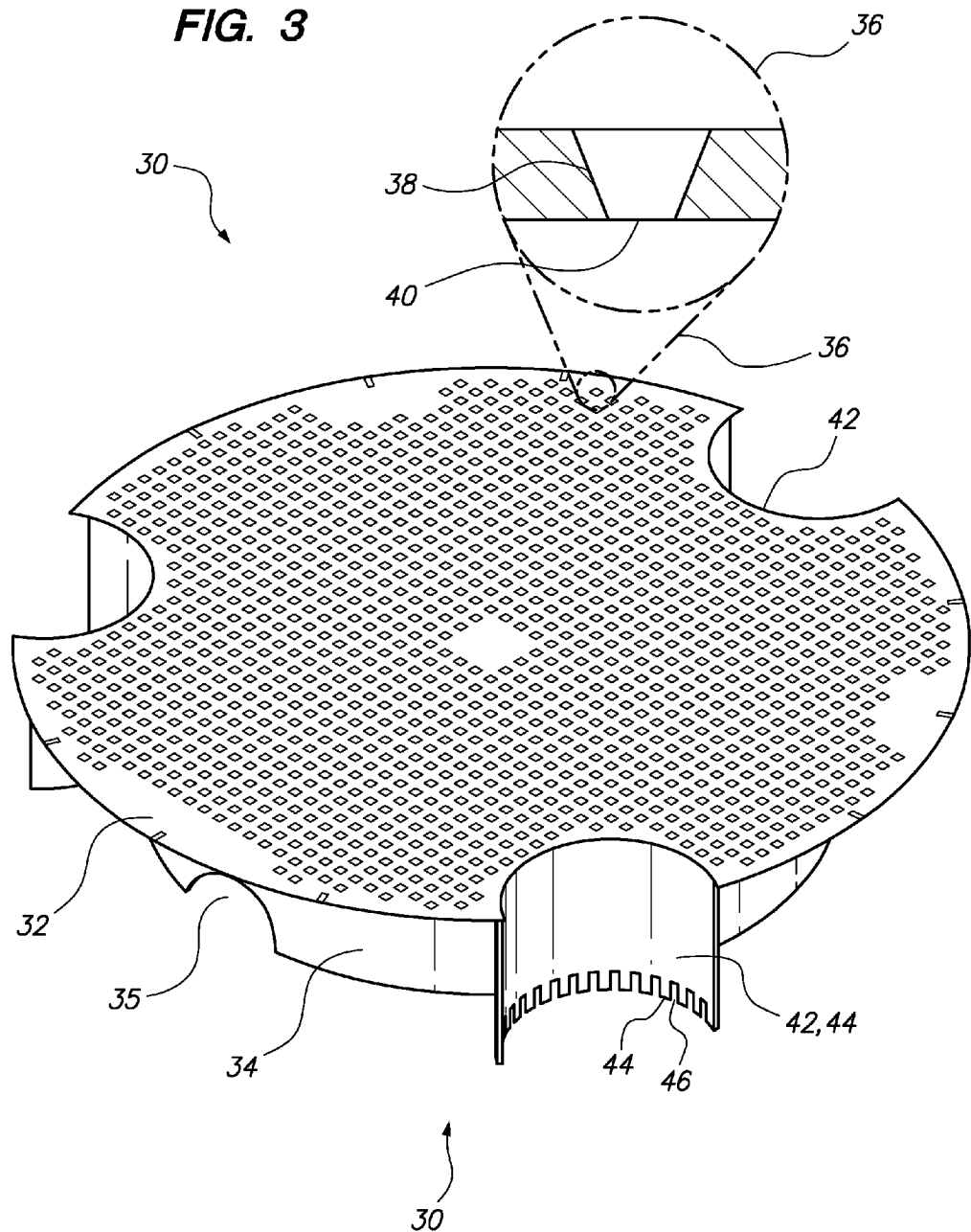
FIG. 3 is a top perspective view of best mode Insert Member with blow-up cross-sectional view of Root-Pruning Aeration Aperture.
Figure 5:
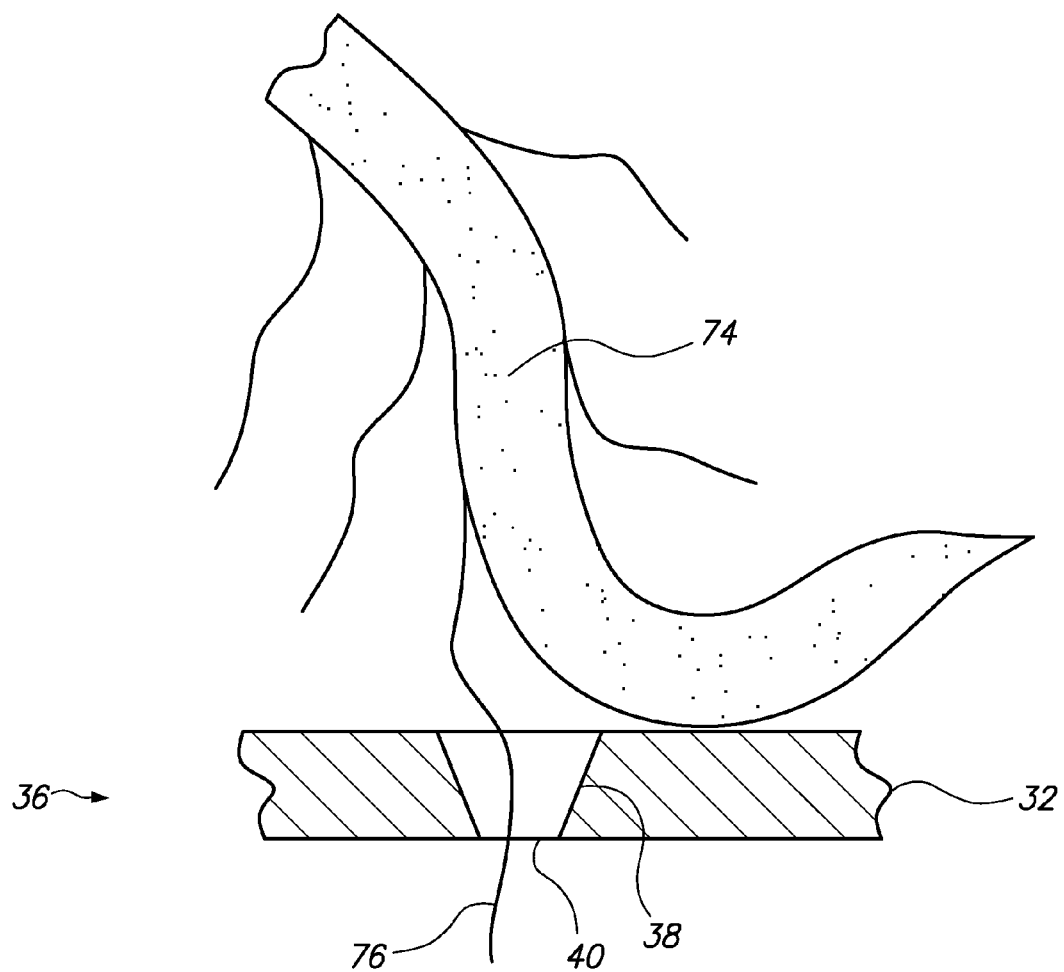
FIG. 5 is a blow-up view of a Root-Pruning Aeration Aperture with a root hair lodged therein.
Figure 6:
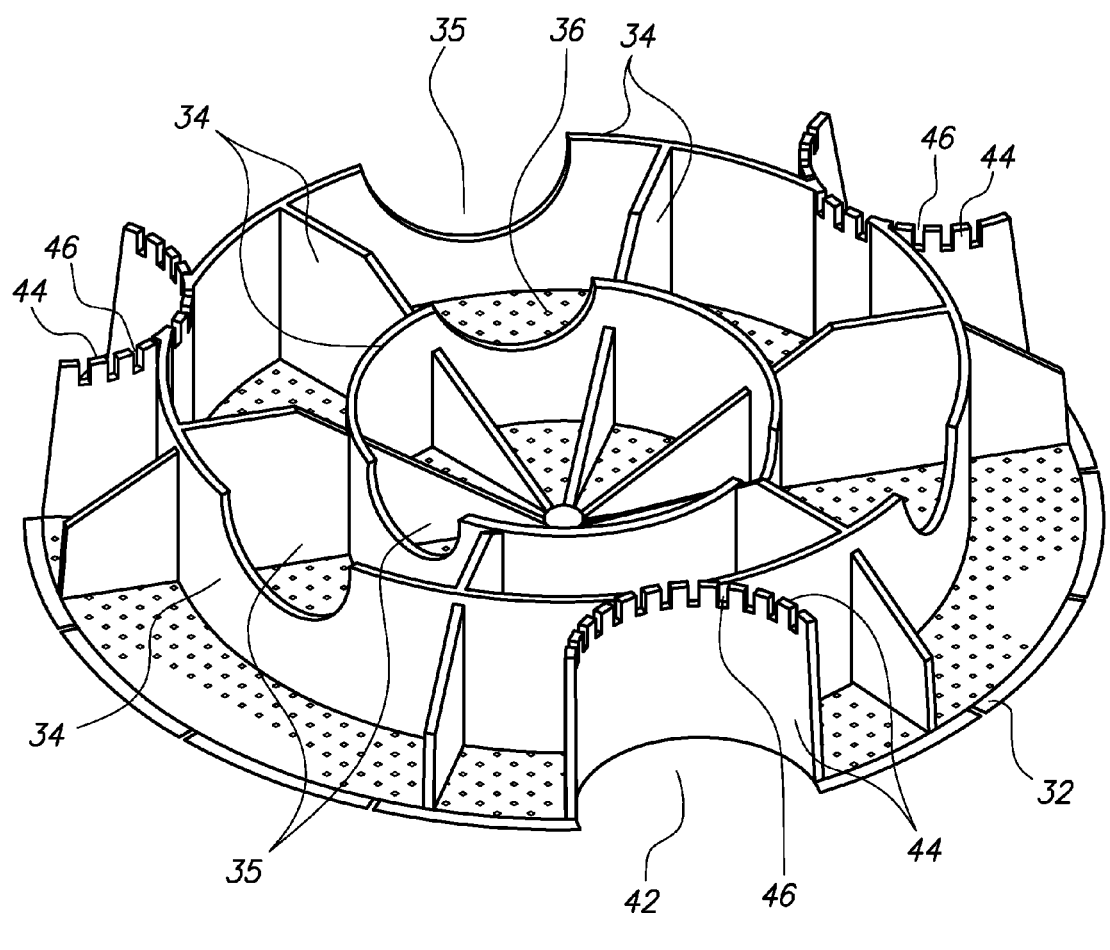
FIG. 6 is a bottom perspective view of best mode Insert Member.

| DEFINITION LIST | |
|---|---|
| Term | Definition |
| 10 | Saucer Member |
| 14 | Saucer Member Bottom |
| 16 | Saucer Member Side |
| 20 | Flowerpot Member |
| 22 | Bottom Member |
| 24 | Side Member |
| 26 | Drainage Hole |
| 28 | Brim |
| 30 | Insert Member |
| 32 | Growing Medium Support Layer |
| 34 | Support Member for Growing Medium Support Layer |
| 35 | Reservoir Flow Void |
| 36 | Root-Pruning Aeration Aperture |
| 38 | Funnel Member |
| 40 | Lower Aperture Opening |
| 42 | Wicking Chamber Knockout Section |
| 44 | Wicking Chamber Separation Wall |
| 46 | Wicking Chamber Soil Contact Void |
| 50 | Water Reservoir |
| 55 | Water or Nutrient Solution Level |
| 60 | Air Layer |
| 70 | Plant |
| 74 | Plant Root(s) |
| 76 | Root Hair or Very Small Root |
| 78 | Soil or Growing Medium Main Chamber |

DETAILED DESCRIPTION OF THE INVENTION

Self-watering fruit tree container comprises: a saucer member 10, a flowerpot member 20, and an insert member 30. Saucer member 10, flowerpot member 20, and insert member 30 all must have a similarly shaped footprint or similar overall shape from plan view because these members must stack together to form the self-watering fruit tree container. Each member must have a similar length and width in order to stack with the other members. Flowerpot member 20 is placed partially within saucer member 10 and insert member 30 is placed completely within flowerpot member 20. Typically, self-watering fruit tree container has members 10, 20, and 30 that are all circular, oval, square, rectangular, or triangular shaped, but they could be any shape. In best mode, self-water fruit tree container has circular-shaped members; thus, saucer member 10, flowerpot member 20, and insert member 30 all have a general circular-shaped foot print or plan view.

In best mode, members 10, 20, and 30, are each molded as one-piece units, including all sub elements within the member, so that members 10, 20, and 30 each have monolithic construction. Monolithic construction is preferred because this type of construction holds up best without deterioration at the seams from deterioration resulting from sun, water, wind, or other exposure from the elements because there are no seams with monolithic construction. Plant containers must hold up to extended exposure to the elements for several years in order to be considered high quality plant containers.

Saucer member 10 comprises a saucer member bottom 14 and at least one saucer member side 16. Saucer member 10 is a container with bottom member 14 and side members 16 so that the container is capable of holding liquid, without leaking the liquid. Saucer member 10 must be capable of holding at least one gallon of water or nutrient solution when placed horizontally level. Saucer member bottom 14 is a rigid non-permeable horizontal planar member used as the bottom member of saucer member 10. Saucer member 10 is used as a container or saucer to hold water or nutrient solution for the plant to absorb into its root system. Saucer member sides 16 make up the sides of this container. Saucer member bottom 14 may be circular, oval, square, rectangular, triangular shaped, or other as discussed above. In the case of a circular or oval bottom member 14, there would be only one side member 16, which would be circular ring shaped or oval ring shaped, and would act as the side members for the whole container, which would be shaped like a short bucket or saucer. If saucer member bottom 14 is square or rectangular shaped, there would be four saucer member sides 16 required to complete the container saucer member 10. If saucer bottom member 14 is triangular, three saucer member sides 16 are required to complete the container saucer member 10, and so on. In best mode, saucer member bottom 14 is a circular-shaped member. Saucer member sides 16 are rigid non-permeable members. Typically, saucer member sides 16 are integral to each other and to saucer member bottom 14 and saucer member 10 is formed as one piece. Saucer member sides 16 are connected to each other and to saucer member bottom 14 to form a non-permeable connection between these members. Saucer member sides 16 essentially rise upwards from the edges of bottom member 14, which lies horizontally, to form a saucer-shaped container 10. Taller saucer member sides 16 allow container 10 to hold more water or nutrient solution. Saucer member sides 16 likely need to be at least two inches tall or more in order to hold the required minimum of one gallon of water or nutrient solution.

Flowerpot member 20 comprises a bottom member 22 and at least one side member 24. Flowerpot member 20 is a container with a bottom member 22 and side members 24 so that the container is capable of holding soil or other growing medium along with a living plant with root system. Flowerpot member 20 must be sturdy and capable of holding at least 100 pounds of wet soil and plant without breaking. Bottom member 22 is a rigid to semi-rigid horizontal planar member used as the bottom member of the container.

Bottom member 22 and side members 24 make up the flowerpot member 20 container and are non-permeable rigid members that are impenetrable to light. Light should not shine onto plant roots 74 through members 22 and 24. Bottom member 22 may be circular, oval, square, rectangular, triangular shaped, or other as discussed above. In the case of a circular or oval bottom member 22, there would be only one side member 24, which would be circular ring shaped or oval ring shaped, and would act as the side members for the whole container, which would be shaped like a short bucket or saucer. If bottom member 22 is square or rectangular shaped, there would be four side members 24 required to complete the flowerpot member 20. If bottom member 22 is triangular, three side members 24 are required to complete the flowerpot member 20. In best mode, bottom member 22 is a circular-shaped member.

Side members 24 are rigid non-permeable members. Typically, side members 24 are integral to each other and to bottom member 22 and flowerpot member 20 is formed as one piece. Side members 24 are connected to each other and to bottom member 22 to form a non-permeable connection between these members. Side members 24 essentially rise upwards from the edges of bottom member 22, which lies horizontally, to form a flowerpot-shaped container 20. Taller side members 24 allow container 20 to hold more growing medium and larger plants.

Flowerpot member 20 further comprises at least one drainage hole 26 to allow liquid to freely pass through flowerpot member 22. At least one drainage hole 26 is a void in flowerpot member 20 to allow any liquid that would otherwise pool in the bottom of flowerpot member 20 to drain out through the at least one drainage hole 26. At least one drainage hole 26 is located in side member 24 and/or bottom member 22. At least one drainage hole 26 must be large enough to prevent any surface tension build up of water or liquid while exiting through the at least one drainage hole 26 that would restrict the drainage flow but not large enough to allow free spilling of dirt or growing medium from inside flowerpot member 20 through the at least one drainage hole 26. At least one drainage hole 26 typically ranges in size from about ⅛ to 4 square inches in area. At least one drainage hole 26 sits in water reservoir 50 when flowerpot member 20 is placed into saucer member 10. The liquid that must freely pass is water or nutrient solution from water reservoir 50.

Flowerpot member 20 further comprises a brim 28. Brim 28 is a lip member around the perimeter of the top edge of flowerpot member 20. Brim 28 is a curled member extended radially outward from the upper edges of side member(s) 24. Brim 28 is connected to the upper edge of side member 24 to form a non-permeable connection to members 24 around the entire upper perimeter of flowerpot member 20. Typically, side members 24 and brim 28 are integral to each other and are formed as one piece. Brim 28 curls over and downward from upper edges of members 24 to form a lip member, with convex upper surface and concave lower surface. Brim 28 functions to provide a lifting handle for flowerpot member 20. Thus, there is a lifting handle around the entire upper perimeter of flowerpot member 20. A person may insert their fingers in the concave under section of brim 28 to provide a very firm handle on the flowerpot member 20. Brim 28 must be very sturdy and able to support at least 100 pounds of soil and plant robustly without cracking or breaking, even after years of weather exposure.

Insert member 30 is installed into the bottom of flowerpot member 20, where insert member 30 is used as a "false bottom" for flowerpot member 20. Insert member 30 supports the growing medium 78 upwards so that water reservoir 50 may be located under growing medium 78. This arrangement is required in order to achieve the self-watering aspect of wicking water upwards while not allowing too much absorption, which would occur if soil 78 placed under the water or nutrient solution level 55 as with the typical flowerpot/saucer arrangement. Thus, an air layer 60 exists between soil or growing medium 78 and water or nutrient solution level 55. Insert member 30 must be sturdy and able to hold at least 100 pounds of soil and plant. When insert member 30 is placed into the bottom of flowerpot member 20, the lower surface of insert member 30 rests on the upper surface of bottom member 22.

Flowerpot member 20 is paired with insert member 30 and vice versa. The dimensions of flowerpot member 20 must be paired exactly with the dimensions of insert member 30 because the insert member must form a slip-fit within the bottom of flowerpot member 20. The fit must be precise so that soil or growing medium will not slide between the crack or seam between the outer edges of insert member 30 and inner surfaces of side members 24, where this crack or seam must remain soil-tight even when self-watering fruit tree container is moved around aggressively with a living plant and soil inside. In best mode, growing medium support layer 32 has tabbed outer edges (depicted not labeled). Tabbed outer edges are tab-shaped members extending radially outward from the outer edges of growing medium support layer 32. Tabbed outer edges are semi ridged tab members that hinge upwards as insert member 30 is installed and pressed down into the bottom of flowerpot member 20. This hinge movement is caused by pressure from at least one side member 24 pushing radially inward and upward as insert member 30 is pressed against at least one side member 24. Additionally, insert member 30 must remain horizontally flat and level for the self-watering aspect to function properly, so insert member 30 structure must pair with that of flowerpot member 20 and specifically that of growing medium support layer 32 to render insert member 30 horizontally flat and level within the flowerpot member 20.

Insert member 30 is rigid horizontal platform structure. Insert member 30 comprises: a growing medium support layer 32, at least one support member for growing medium support layer 34, at least two root-pruning aeration apertures 36, and at least one wicking chamber knockout section 42. Growing medium support layer 32 is a rigid to semi rigid horizontal planar member used as a false bottom to support soil or growing medium 78 above water reservoir 50. Growing medium support layer 32 covers about 70-90 percent of the upper surface of the bottom member on the flowerpot member. The purpose is to position soil and plant above water or nutrient solution level 55 of water reservoir 50 so that there is an airspace layer 60 between growing medium support layer 32 and water or nutrient solution level 55. As stated above, growing medium support layer 32 has overall shape that allows it to be placed inside of the bottom of flowerpot member 20, where there is a tight slip fit between these members. In best mode, insert member 30 is circular-shaped. Growing medium support layer 32 must be sturdy enough to support at least 100 pounds of wet soil and plant without cracking or breaking and must remain so after many years after being exposed to the elements or weather. At least one support member for growing medium support layer 34 functions to support growing medium support layer 32 above the water reservoir 50. At least one support member for growing medium support layer 34 is a rigid vertical member that supports growing medium support layer 32 from underneath it like a support beam or joist. At least one support member for growing medium support layer 34 extends at right angle downward from the lower surface of growing medium support layer 32. At least one support member for growing medium support layer 34 must be tall enough to support growing medium support layer 32 above water or nutrient solution level 55, and thus member 34 must be taller than saucer member sides 16, as this height represents the maximum water or nutrient solution level 55, where water reservoir 50 would then spill over sides 16. It is best to have at least one inch of air layer 60 to allow for proper drying and aeration of soil 78. In most cases, growers do not keep the water or nutrient solution level 55 is at a level that is completely full, so the design allows for a one-inch thick air layer 60 in the state of the water or nutrient solution level 55 is at a level that is less than completely full. So at least one support member for growing medium support layer 34 should rise at least one quarter inch taller than saucer member sides 16 to provide an air layer 60 that is about one inch thick. In best mode, at least one support member for growing medium support layer 34 is integral to growing medium support layer 32 and insert member 30 is formed as one piece.

At least one support member for growing medium support layer 34 further comprises at least one reservoir flow void 35. A reservoir flow void 35 is a void in at least one support member for growing medium support layer 34 to allow the "free flow" of water or nutrient solution under at least one support member for growing medium support layer 34. At least one support member for growing medium support layer 34 rests vertically on the upper surface of bottom member 22. Under normal operation of the self-watering container, the lower surface at least one support member for growing medium support layer 34 lies under water or nutrient solution level 55 and is completely immersed in water reservoir 50 at all times. In order for wicking to occur properly and for water or nutrient solution 50 to be continuously absorbed upwards into the soil or growing medium main chamber 78, there must be free flow of water or nutrient solution 50 into at least one wicking chamber knockout section 42 as discussed below. If at least one reservoir flow void 35 was not present then the required flow of water or nutrient solution 50 could be constricted or damned by the at least one support member for growing medium support layer 34. At least one reservoir flow void 35 prevents this flow constriction from occurring. At least one reservoir flow void 35 is a hole in the damn that is at least one support member for growing medium support layer 34. Typically, the network of at least one support members for growing medium support layer 34 form cells or cellular structure on the bottom of insert member 30. In this event, there should be at least one reservoir flow void 35 per each cellular formation of at least one support members for growing medium support layer 34 to allow for free flow of water or nutrient solution 50 in and out of each cellular formation of at least one support members for growing medium support layer 34.

When insert member 30 is initially installed into flowerpot member 20, attention must be paid to not align any of the at least one reservoir flow voids 35 of insert member 30 with any of the at least one drainage holes 26 of flowerpot member 20 because this could result in the spilling of soil or growing medium 78 out of flowerpot member 20. By not aligning members 35 and 26, any soil or growing medium 78 that may spill out through wicking chamber separation wall 44 through wicking chamber soil contact void 46 of insert member 30 will remain at least inside flowerpot member 20 by side member(s) 24.

In best mode, root-pruning aeration apertures 36 are spaced evenly throughout the entire surface of growing medium support layer 32. Root-pruning aeration apertures 36 must be designed so that roots 74 may not penetrate through growing medium support layer 32, where most roots attempting to grow through growing medium support layer 32 are redirected back upwards to remain within soil or growing medium 78, while allowing thin root hairs or very thin roots 76 to penetrate growing medium support layer 32, through lower aperture opening 40, and into water reservoir 50, while also leaving air to permeate in and out through root-pruning aeration apertures 36. As stated above, aeration is done to promote drying of soil or growing medium main chamber 78, which is required to prevent root rot disease.

This special achievement is accomplished by specially shaped root-pruning aeration apertures 36 spaced appropriately throughout growing medium support layer 32. Root-pruning aeration apertures 36 are generally funnel shaped apertures, with the large opening facing upwards. Root-pruning aeration apertures 36 function to redirect larger roots 74 upwards into soil or growing medium 78 or redirect larger roots 74 from growing downward through growing medium support layer 32. This is done to prevent roots from growing through air layer 60 and into water reservoir 50 thereby becoming too wet which could lead to root rot disease as discussed above. However, root hairs 76, which are thin lateral outgrowths from roots 74, and very small roots 76, are capable of being soaked in water continuously without developing a root rot condition. This is a result of their properties including the physical properties of being a singular aerated strand of small diameter stretched across an air layer 60. Singular aerated strands of small diameter are too small to wick large amounts of water across the air layer 60 and into soil or growing medium main chamber 78 and thus do not lead to a root-rot condition. Thus, even when their ends are kept continuously wet, root hairs and very small roots 76 will not develop root rot if there is an air space layer separating the soaked ends and the soil or growing medium main chamber 78 surrounding the larger roots 74. However, root hairs and very small roots 76 are still capable of continuously absorbing water and nutrients internally for the plant to use. This arrangement achieves a faster water and nutrient absorption rate by the plant without the threat of root rot. Thus, it is better for the harvest to keep root hairs and very small roots 76 continuously wet. Root-pruning aeration apertures 36 promote this condition.

Root-pruning aeration apertures 36 comprise: a funnel member 38 and a lower aperture opening 40. Funnel member 38 is funnel shaped rigid impermeable member with hole through center, like a typical funnel. The opening on its upper end is larger than the opening on its lower end to yield the funnel shape. The hole in the lower end of this funnel shape is lower aperture opening 40. Funnel member 38 is a void in growing medium support layer 32, with the top edge of the funnel shape essentially flush with the upper surface of growing medium support layer 32 and lower aperture opening 40 essentially flush with the bottom surface of growing medium support layer 32. Thus, lower aperture opening 40 opens into air layer 60 with water reservoir 50 below it. The funnel shape is used to redirect a larger root 74 back upwards into soil or growing medium main chamber 78 and/or to force a root hair or very small root 76 to grow into water reservoir 50. The upper opening of funnel member should be about 1.5-4 times that of lower aperture opening 40 in order to yield the proper deflection angle and pruning angle on funnel member 38 to sprout root hair or very small root 76 leading to water reservoir 50. Lower aperture opening may not have diameter larger than that of the root hair or very small root 76 of the particular plant 74. This will vary with the particular plant type. Best mode root-pruning aeration apertures 36 were designed for fruit trees and similarly sized plants where root-pruning aeration apertures 36 have an upper opening of about ⅛-¾ inches in inner diameter and a lower aperture opening 40 of about 0.050-0.300 inches in inner diameter. Root-pruning aeration apertures 36 may be circular-shaped, oval-shaped, triangular-shaped, square-shaped, rectangular-shaped, pentagonal-shaped, or hexagonal-shaped, or have other shape. In best mode, apertures are squared-shaped because the square aperture allow for air permeation through its four corners when there is a root hair or very small root 76 growing through it. Roots and hairs have circular cross sections so they do not fill the corners of a square-shaped aperture. Thus, in effect, in best mode, root-pruning aeration apertures 36 are "square-shaped funnels", with square-shaped horizontal cross-sections, rather than the usual round-shaped funnel.

In best mode, root pruning aeration apertures 36 encompass about half of the area of growing medium support layer 32 and are evenly spread throughout. Thus, half of the area of growing medium support layer 32 is plain impermeable member as described above while the other half consists of root pruning apertures 36 as described above. This results in a growing medium support layer 32 with upper surface that has apertures 36 positioned in an even checkered pattern throughout. In this way, there is a 50 percent likelihood that a root 74 as it grows downward will strike standard impermeable area of layer 32 or strike the upper portion of root pruning aeration aperture 36. Those roots 74 that strike impermeable areas are redirected laterally across growing medium support layer 32 or back upwards thereby keeping said root 74 inside of soil area 78. Those roots 74 that strike the upper portion of root pruning aeration apertures 36 will be pruned and as they grow down one side of the funnel shape to be stopped by lower aperture opening 40 because it is too small for most roots to pass and are forced grow a tiny root 76 or sprout root a root hair 76 that will be pass through the lower aperture opening 40 to grow into water reservoir 50. This is desirable to maximize plant absorption of water and nutrients. Alternately, the larger root 74 may become wedged into the bottom of funnel member 36, in which case the physical constraints of funnel member 36 with very small hole 40 at the bottom prevent any further growth of the root except for that of a very small root diameter root to pass through lower aperture opening 40. In this way, the larger root 74 becomes pruned into just a small root extension 76. This small root is then permitted to grow into water reservoir 50 without causing a root rot condition in soil or growing medium main chamber 78.

At least one wicking chamber knockout section 42 is a portion of growing medium support layer 32 that is removed or "knocked-out" to allow for the would-be soil or growing medium resting on this section to essentially fall down below growing medium support layer 32 and into water reservoir 50. The soil or growing medium in the at least one wicking chamber knockout section 42 is horizontally supported by flowerpot member bottom 14.

Thus, the lower portion of the soil or growing medium located in at least one wicking chamber knock-out section 42 continuously lies in water or growing medium 50 pooled in saucer member 10. This allows this portion of the soil or growing medium to act as a wicking agent to absorb liquid, which is then absorbed by the soil or growing medium above that, and so on, to create a general upward flow of liquid into the main soil or growing medium chamber 78. This flow results from capillary action in the roots and in the soil or growing medium located in at least one wicking chamber knockout section 42. At least one wicking chamber knockout section 42 must be sized in relation to the total area of growing medium support layer 32 so that at least one wicking chamber knockout section 42 wicks up enough water or nutrient solution to allow continuous absorption of such by the plant 70 through the roots in the soil or growing medium main chamber 78 without wicking up too much water or nutrient solution so as to create conditions in soil or growing medium main chamber 78 that are damp enough to cause root rot. In order to accomplish this with larger plants like fruit trees, there should be about a 1:12 ratio between the footprint area of at least one wicking chamber knockout section and the footprint area of soil or growing medium main chamber 78.

At least one wicking chamber knockout section 42 comprises wicking chamber separation walls 44. A wicking chamber separation wall 44 is an impermeable rigid member extending vertically downward from growing medium support layer 32 to rest on the upper surface of bottom member 22. Wicking chamber separation walls 44 surround at least one wicking chamber knockout section 42 to prevent soil or growing medium from spilling into water reservoir 50. Water reservoir 50 is located in the bottom of saucer member 10 as stated above. Thus, with insert member 30 installed properly into the flowerpot member 20, the lower layer of the soil or growing medium in at least one wicking chamber knockout section 42 sits in water reservoir 50. Wicking chamber separation wall 44 prevents this soil from spilling into water reservoir 50 as a result of the pressure pushing down from the soil resting above it. Wicking chamber separation walls 44 also support growing medium support layer 32 like a beam or joist. Walls 44 along with at least one support member 34 must hold growing medium support layer 32 horizontally level above water or nutrient solution level 55, thus these members must have the same height and must rise higher than saucer member sides 16 to accomplish this. Typically, growing medium support layer 32 and separation walls 44 are integral to each other and insert member 30 is formed as one piece. Thus, there is an impermeable connection between growing medium support layer 32 and wall members 44.

Wicking chamber separation walls 44 further comprise at least one wicking chamber soil contact void 46. At least one wicking chamber soil contact void 46 is a small void in the lower end of wicking chamber separation walls 44 that functions to allow water or nutrient solution from water reservoir 50 to flow in and out of at least one wicking chamber knockout section 42 as required to keep capillary flow of water absorption into soil or growing medium main chamber 78. At least one wicking chamber soil contact void 46 must be large enough to allow enough water to freely flow into at least one wicking chamber knockout section 42 in order to keep up with plant absorption requirements, however, at least one wicking chamber soil contact void 46 must not be too large so as to let soil or growing medium seep into water reservoir 50. If an appreciable amount soil or growing medium seeps into water reservoir 50, there is danger of root rot. In best mode, at least one wicking chamber soil contact void 46 is an oblong-shaped or rectangular-shaped void, standing upright, sized at about 3/16×1/2 inches. This size at least one wicking chamber soil contact void 46 may be placed along all lower edges of wicking chamber separation walls 44 on a 1/2 inch center-to-center spacing without leading to any appreciable soil or growing medium seepage into water reservoir 50.

Saucer member 10 should be kept with water or nutrient solution pooled in it at all times. Depending on a variety of factors, including the type of plant, whether the plant is placed in the sun or shade, weather conditions, etc., this may require that the plant grower refill the water reservoir once or twice a day. In other cases, the plant grower may only need to refill the reservoir once a week or so. No matter what the refilling frequency, it is important to keep the reservoir 50 pooled with water or nutrient solution.

With self-watering fruit tree container, the plant grower may check the water or nutrient solution level 55 in the water reservoir 50 by simply walking past it or visually inspecting it from a distance. Further, if the plant grower notices that water reservoir is low, he may simply refill it from the side of the plant. This is because saucer member 10 has a much upper wider opening than that flowerpot member 20, so saucer member 10 extends outward beyond flowerpot member 20, to provide enough room to visually inspect water or nutrient solution level 55 in saucer member 10 and enough room to easily refill water reservoir 50 with a simple watering container, bucket, hose, or other method without dismantling anything in self-watering fruit tree container or even touching anything on the plant container.

What is claimed is:

1. A self-watering fruit tree container comprising:

a saucer member, comprising a saucer member bottom and at least one saucer member side, wherein said saucer member bottom is a rigid horizontal impermeable planar member with an upper surface and a lower surface, said at least one saucer member side is a rigid impermeable planar, cylindrical, or conical member extending upwards from the entire perimeter of said saucer member bottom, to form an impermeable container with an open top that is capable of holding at least one gallon of fluid;

a flowerpot member, comprising a bottom member and at least one side member, wherein said bottom member is a rigid horizontal non-permeable planar member with an upper surface and a lower surface, said at least one side member is a rigid impermeable planar, cylindrical, or conical member extending upwards from the perimeter of said bottom member, to form a container with an open top that is capable of holding at least 100 pounds of wet soil or growing medium when horizontal, wherein said at least one side member further comprises at least one drainage hole, wherein said at least one drainage hole is a void in said at least one side member to allow any excess liquid that might otherwise pool in the wet soil or growing medium to drain through said at least one drainage hole; and an insert member, comprising a growing medium support layer, at least one support member for growing medium support layer, at least two root-pruning aeration apertures, and at least one wicking chamber knockout section, wherein said flowerpot member fits within said open top of said saucer member to rest horizontally on said upper surface of said saucer member bottom, so that said bottom member of said flowerpot member is located entirely within said saucer member and below said open top of said saucer member, said at least one side member of said flowerpot member has a larger height dimension than that of said at least one saucer member side and thus rises higher than said saucer member, said insert member is a rigid horizontal platform structure, capable of supporting at least 100 pounds of wet soil or growing medium, that rests horizontally on said upper surface of said bottom member of said flowerpot member to cover 70-90 percent of said upper surface of said bottom member, while leaving the rest of said upper surface of said bottom member uncovered, said insert member fits entirely within said open top of said flowerpot member, said growing medium support layer is a horizontal planar member with an upper surface and a lower surface that supports soil or growing medium above said upper surface of said bottom member of said flowerpot member, said growing medium support layer is impermeable except for where said at least two root-pruning apertures are located therein, which are permeable, said at least one support member for growing medium support layer is a rigid vertical member extending downward from the said lower surface of said growing medium support layer to support said growing medium support layer horizontally above said open top of said saucer member, said at least two root-pruning aeration apertures are each a generally funnel-shaped aperture in said growing medium support layer with an upper opening flush with said upper surface of said growing medium support layer and a lower opening flush with said lower surface of said growing medium support layer, said generally funnel-shaped apertures function: a) to redirect plant root growth upwards to allow a root hair or lateral outgrowth from the root to grow downwards through said lower opening or (b) to prune a plant root into a small root with an equivalent diameter to a root hair to allow said small root to grow downwards through said lower opening, thereby preventing all plant root growth, except for root hairs and small roots with equivalent diameters to root hairs, from growing downwards through said lower opening, said upper opening has a width of 1.5-4 times that of said lower opening, thereby giving the aperture its funnel shape, said lower opening has a width of 0.050-0.300 inches, said at least two root-pruning aeration apertures each have a horizontal cross-section that is essentially circular, oval, triangular, square, rectangular, pentagonal, or hexagonal, said at least one wicking chamber knockout section is a portion of said growing medium support layer that is removed or so as to not cover said upper surface of said bottom member of said flowerpot member, to allow for the soil or growing medium to fall down to rest on said upper surface of said bottom member of said flowerpot member, below said growing medium support layer, said at least one wicking chamber knockout section further comprises at least one wicking chamber separation wall which is an impermeable rigid member extending vertically downward from said bottom surface of said growing medium support layer to support said growing medium support layer from underneath to help support said growing medium support layer horizontally above said open top of said saucer member, and said at least one wicking chamber separation wall further comprises at least two wicking chamber soil contact voids which are voids in said impermeable rigid member of said at least one wicking chamber separation wall to allow for the passage of liquid there through.

* * * * *